Oct. 2, 1934.  A. G. LEONARD, JR  1,975,584
MACHINE FOR MANUFACTURING COMPOSITION ROOFING
Filed Oct. 13, 1931  3 Sheets-Sheet 1
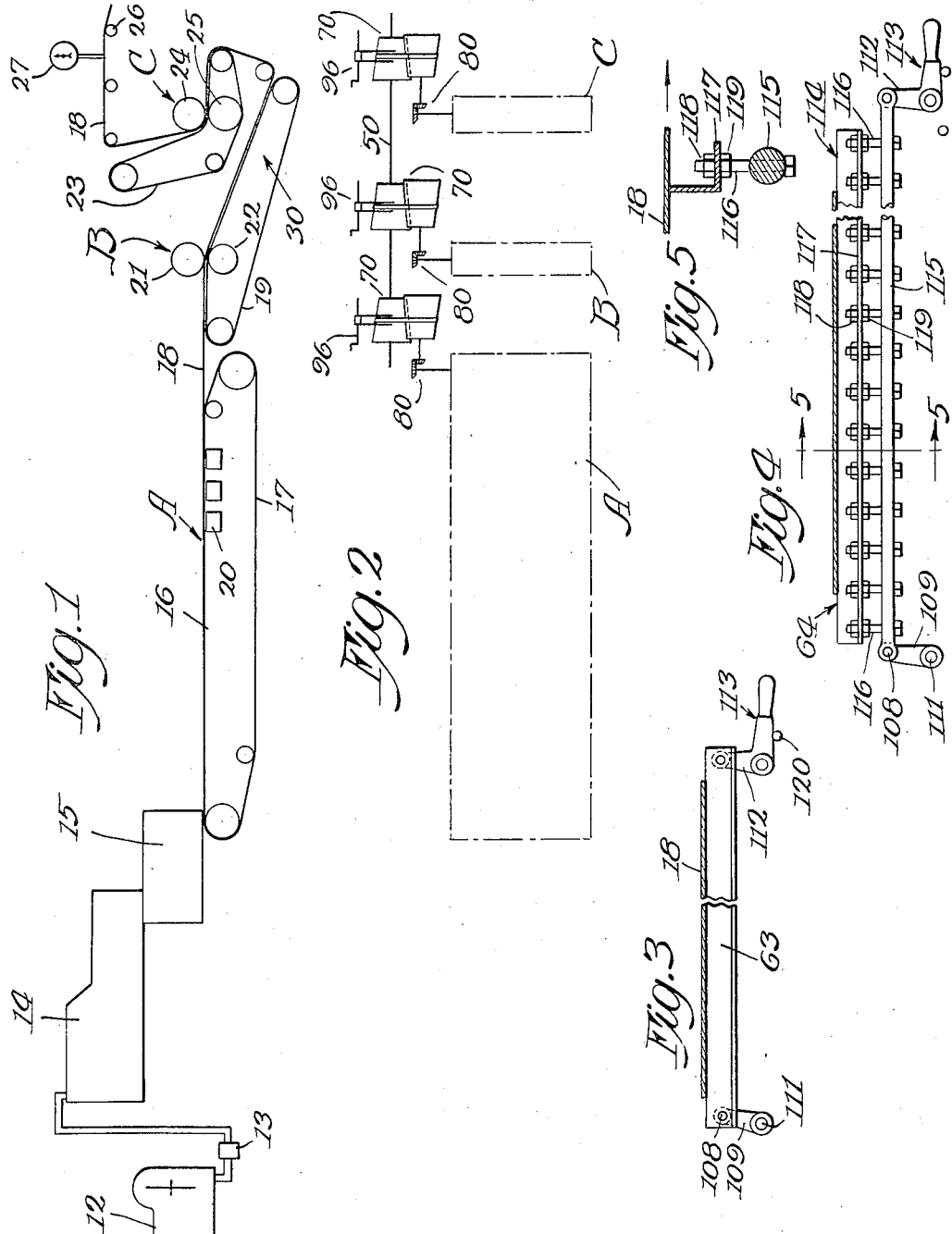
Inventor
Arthur G. Leonard, Jr.
By Gillson Manned Cox Attys.

Oct. 2, 1934.  A. G. LEONARD, JR  1,975,584
MACHINE FOR MANUFACTURING COMPOSITION ROOFING
Filed Oct. 13, 1931   3 Sheets-Sheet 2
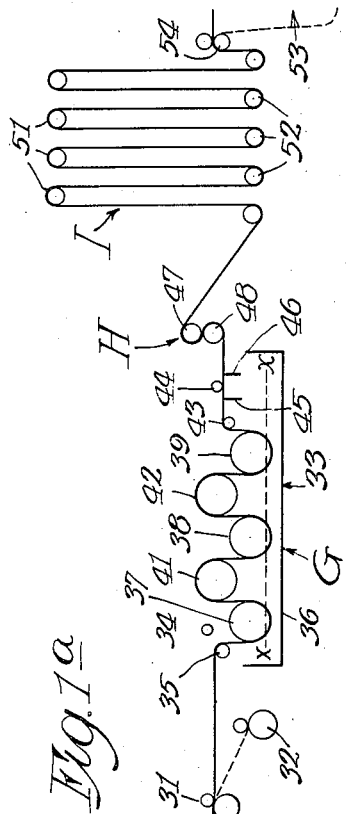
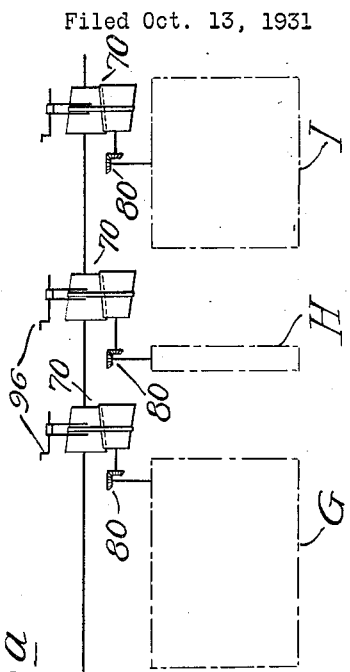
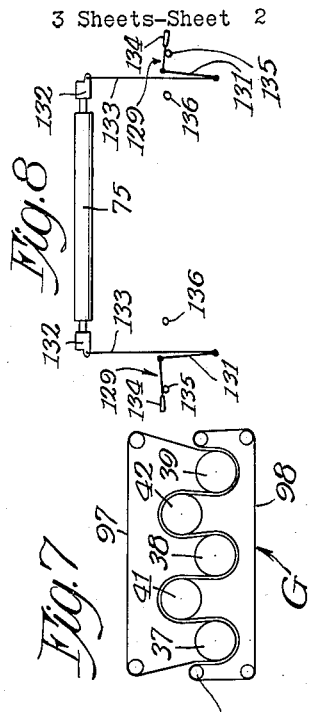
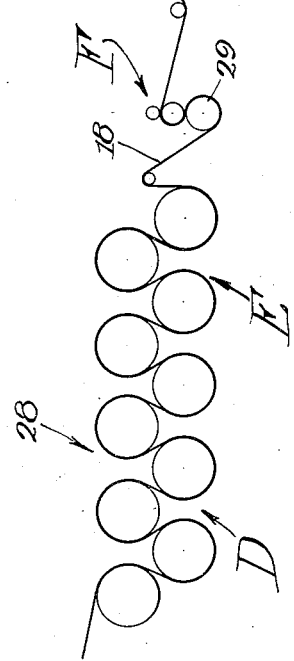
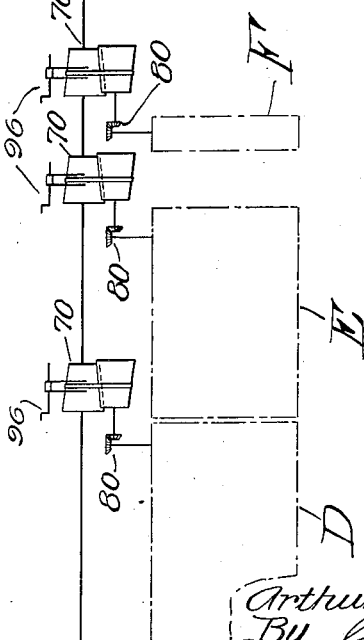
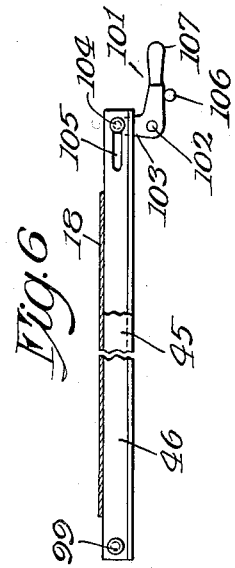
Inventor
Arthur G Leonard, Jr.
By Gilson, Mann & Lenz
Attys.

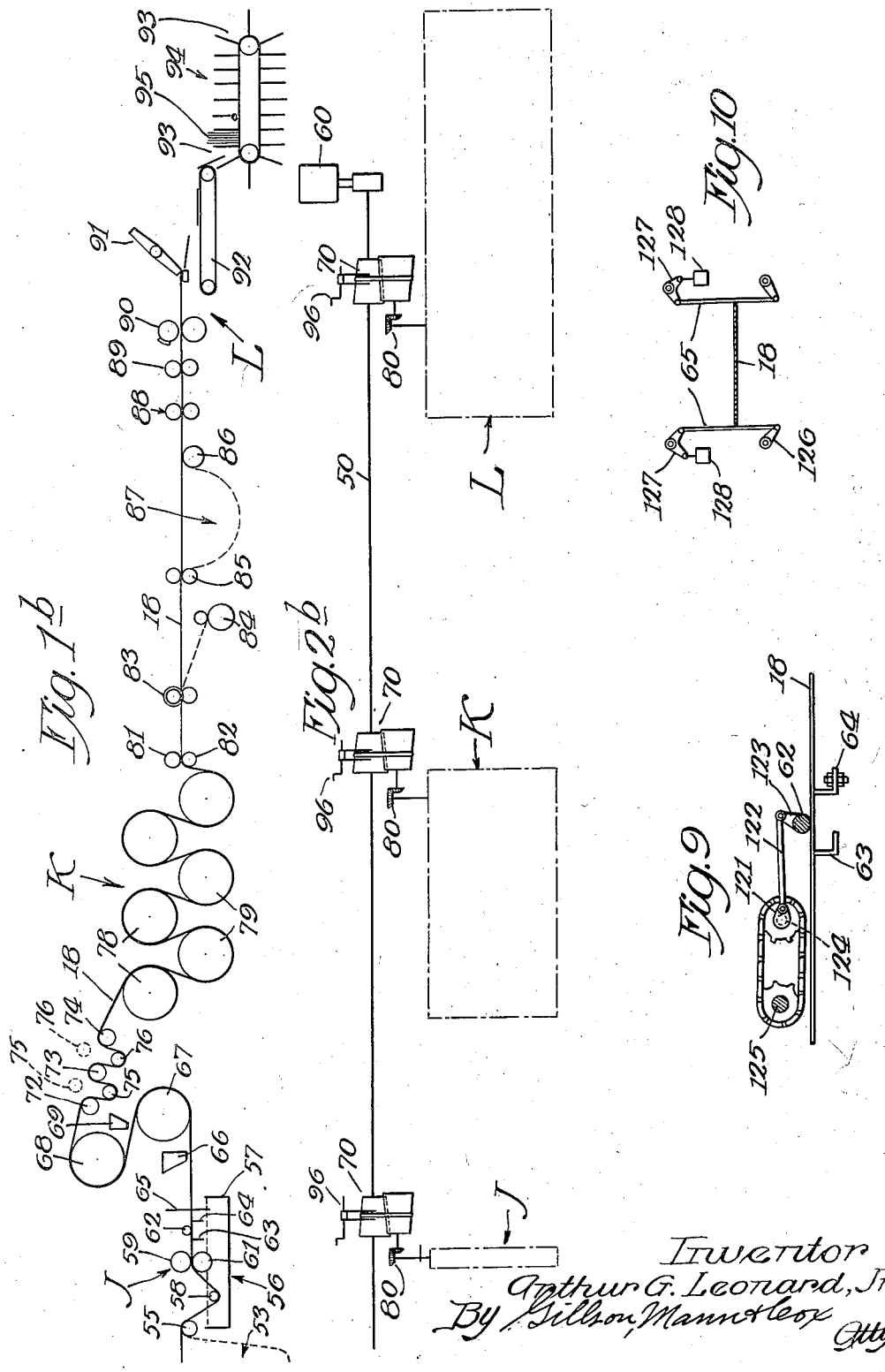

Patented Oct. 2, 1934

1,975,584

UNITED STATES PATENT OFFICE 1,975,584

MACHINE FOR MANUFACTURING COMPOSITION ROOFING

Arthur G. Leonard, Jr., Wilmington, Ill., assignor to Orenda Corporation, a corporation of Illinois Application October 13, 1931, Serial No. 568,568

3 Claims. (Cl. 92—40)

This invention relates to a machine for manufacturing composition roofing, either in rolls or strip shingles.

One of the objects of the invention is the provision of a new and improved machine for making the ground felt, impregnating the same with a waterproofing compound, coating, the saturated felt base, finally cutting the prepared felt into shingles and bundling the same, all of which is done in one continuous operation.

A further object of the invention is the provision of new and improved mechanism for manufacturing roofing material in a continuous operation, together with novel means for synchronizing the operation of the various parts of the mechanism.

Another object of the invention is the provision of new and improved mechanism for saturating the felt and for cooling the same.

A still further object of the invention is the provision of new and improved means for adjusting the mechanism for facilitating the threading of the same when, for any reason, the felt becomes severed during the operation of the machine.

Other and further objects and advantages of the invention will appear from the following description taken in connection with the accompanying drawings in which Figs. 1, 1a and 1b, taken together, illustrate a side elevation of the entire machine shown diagrammatically;

Figs. 2, 2a and 2b, illustrate a plan view thereof with parts omitted, in the interest of clearness;

Fig. 3 is a side elevation of one of the scraper members disclosed in Fig. 1b and shown more or less diagrammatically with parts in section and parts broken away;

Fig. 4 is a side elevation of another of the scrapers and adjusting mechanism, as shown in Fig. 1b;

Fig. 5 is a section on the line 5—5 of Fig. 4;

Fig. 6 is a side elevation of one of the scrapers shown in Fig. 1a, shown more or less diagrammatically, with parts broken away and parts in section;

Fig. 7 is an end elevation of the saturating rolls showing the felt threading mechanism in position thereon, shown more or less diagrammatically;

Fig. 8 is a front elevation of one of the smoothing rolls showing, diagrammatically, mechanism for raising and lowering the same;

Fig. 9 is a section showing, diagrammatically, mechanism for operating the coating scraper; and Fig. 10 is a front elevation, shown diagrammatically, of the edge scrapers.

Referring now to the drawings, Figures 1, 1a and 1b illustrate diagrammatically the complete machine which comprises the shredder 10 having the hopper 11 for receiving material, such as rags, paper and the like, to make the felt. After this stock has been desintegrated, it is discharged into the beater 12, which reduces the same to pulp in a well-known manner. In actual practice, a number of beaters are employed, and the material—after being shredded—will be discharged into one or more of the beaters, while the others are operating and being discharged. From the beaters 12, the pulp is transferred by a suitable pump, as 13, to the screen receptacle 14, where knots and other foreign matter are separated from the pulp in the usual way. In the screen receptacle the pulp is discharged into a receptacle 15, constituting a head for the Fourdrinier paper machine 16, which will be termed unit A. Since the Fourdrinier paper machine is of the usual or well-known construction, it is not deemed necessary to give a detailed description thereof, further than to state it is of considerable length and has a wire or perforated endless web 17 or fine mesh screened on which the stock is discharged and through which the water escapes. The wire extends across the vacuum boxes 20 which extract still more of the water from the stock, thereby gradually converting the stock into the felt or felt web 18.

The felt 18 is removed from the wire 17 by the endless web or blanket 19 of the first press section 30, which will be termed unit B. The web 19 conducts the felt 18 between the first press rolls 21 and 22, which squeeze out moisture from the felt. After passing through the first press section, the felt is reversed and passed through the second press section 23, in order that what was the lower surface of the felt will become the upper surface. The second press section will be termed unit C. These different units have a common drive mechanism but the mechanism is independently adjustable for each unit, as will presently appear. The second press section 23 is provided with one or more sets of press rolls 24 and 25. From the press rolls 24 and 25, the felt 18 passes over a weighing device 26, which has an indicator 27 for indicating the weight of the felt at all times. When the felt becomes lighter or heavier than required, a signal is flashed in the usual manner and the operator adjusts the gate of the head 15 in order to discharge a greater or less amount of stock on the screen, or wire, of the Fourdrinier machine, to produce felt of the desired thickness or weight. The weighing mechanism 26 is of the usual construction, and it is not considered necessary to describe the same in detail.

From the weighing machine, the felt, which has now become strong enough not to require the use of a supporting web or blanket, is conducted through the drying rolls, designated generally by the reference character 28. These rolls are divided into two sections and the sections will be designated units D and E, respectively.

Any suitable number of rolls may be employed, the number shown being by way of example only. In practice, a large number are necessary. From the drying rolls, the felt 18 passes through the calendar rolls 29 which constitute unit F, and after passing through the trimmer 31 which trims the edges, the felt may be wound on the roll 32 which is provided for that purpose. If the felt is to be converted into roofing, it is conducted from the trimmer 31 to the saturator 33, which will be termed unit G. Suitable nozzles 34 may be, and preferably are, provided for discharging hot asphalt, or other waterproofing compound, on the upper side of the felt, after it passes over the guide roll 35 immediately preceding its emersion in the molten asphalt, or other waterproofing compound, contained in the saturator tank 36. By discharging the waterproofing compound on the felt immediately before passing around the first saturating roll 37, the roll will have a tendency to press the saturant into the pores of the felt, while the latter is passing around said roll.

Any suitable number of rolls may be employed in the saturator; a plurality are preferably used. These rolls have a tendency to force the saturant into the felt while the latter is passing about the rolls. Since a plurality of rolls are used, both sides of the felt are operated upon and the saturant is caused to properly impregnate the felt. In the construction disclosed, three lower rolls 37, 38 and 39 and two upper rolls 41 and 42 are employed.

If desired, a nozzle 34 may be provided for each of the rolls 37, 38 and 39, or for either 38 or 39.

The waterproofing compound, which is usually asphalt, is heated to a high temperature, usually about 450°. The level of the saturant within the tank 36 is maintained slightly above the lower surface of the lower saturant rolls 37, 38 and 39, but below the axes thereof as indicated by the dotted line x—x of Fig. 1a.

The felt after passing beneath the roll 39 is conducted over the guide roll 43 and between the upper scraper 44 and the lower scapers 45 and 46 which remove the excess saturant. From the scrapers the felt passes about and between the squeeze or saturator pull rolls 47 and 48, constituting unit H, and from this unit the felt passes through the looper cooling rolls designated generally by the reference character I. The cooling looper rolls are horizontally arranged and steam heated. This mechanism comprises a plurality of upper rolls 51 and a plurality of lower rolls 52. The felt which has passed through the highly heated saturant is led alternately over and beneath the upper and lower rolls, respectively. The rolls are steam heated, which not only assists in cooling the felt which is at a much higher temperature than the rolls, but also prevents the saturant from sticking to the rolls.

It is common practice to employ looping mechanism for cooling the felt after it has been run through the saturator, but such an arrangement is objectionable.

Such an arrangement is objectionable in a machine that manufactures roofing from fiber in one continuous operation because of the difficulty of causing the felt to travel across the looping mechanism without becoming torn or disarranged and thereby interfering with the operation of the machine. With the present device, the felt is positively conducted across the cooling mechanism I by the rolls 51 and 52. The rolls 51 and 52 are separated a considerable distance apart vertically in order to expose a large surface of the felt to the atmosphere or to air currents, if artificial circulation of the air be employed. Any suitable number of these cooling rolls may be employed, the number shown being by way of example only.

It is desirable that a pit be provided under the whole machine in order that access may be more readily had to the different mechanisms for inspection and repair. The mechanical units are preferably separated at intervals along the machine so that in the event of accident to a portion of the machine, the felt may be received within the pit anterior to the unit, while the difficulty is being remedied, thus avoiding the necessity for the entire machine to cease operation while minor repairs are being made to one of the units.

One of these spaces is indicated at 53 on the drawings. The felt after it leaves the pull rolls 54 is led across the space 53 to the guide roll 55 of the coating unit 56.

In the event that something goes wrong with the coating unit, the web is received within the pit in the space 53; this arrangement is useful only where the difficulty may be remedied or the repairs made in a few minutes at most.

The coating unit 56 comprises a tank or receptacle 57 for containing the coating material which usually is a bituminous material of high melting point. This material is maintained in molten condition and the felt after passing over the guide roll 55 passes into the hot coating compound beneath the roll 58 and from thence it passes between the squeeze or pull rolls 59 and 61, which will be termed unit J. These rolls pull the felt through the coating tank and remove a considerable amount of the excess coating material. The felt then passes between the upper scraper 62 and the lower scrapers 63 and 64 which complete the removal of the excess coating material from the upper and lower surfaces of the felt. The excess coating material is removed from the edges of the felt by the vertically arranged scrapers 65 which are yieldingly held against the edges of the felt as will presently appear.

The felt after having the surplus coating removed passes beneath the hopper 66 which supplies granules to the upper surface thereof. The felt then passes beneath and around the roll 67 which partially embeds the granules. The felt is reversed by the roll 68 about which it moves. A hopper 69 supplies a suitable pulverized material such as talc to the reverse side of the felt, while it is moving from the roll 67 to the roll 68. The talc is partially embedded in the roll 68 about which it moves.

From the roll 68 the felt moves through the embedding unit which comprises a plurality of smoothing rolls. Any suitable number may be employed. The felt passes over the upper rolls 72, 73 and 74 and beneath the lower smoothing rolls 75 and 76 for embedding and smoothing the coating material. The rolls 75 and 76 are so mounted that they may be moved to the dotted line position shown in Fig. 1b, whereby threading of the felt therethrough is facilitated, as will presently appear.

From the embedding unit the felt passes through the cooler unit K comprising a plurality of rolls 78 and 79 of the usual construction and arranged in the conventional manner.

After passing through the pull rolls 81 and 82 the felt is conducted past the slitter 83 which slits the felt in the desired widths.

If the felt is to be used as roll roofing, it is wound on to roller 84, but if it is to be made into shingles, it is conducted over the guide rolls 85 and 86 across the gap 87 between the pull rolls 88 and past the slitter 89. There the felt may, if desired, be slitted longitudinally. It is next conducted through the slotting and cutting unit L which comprises an intermittent slitter 90, which slits the felt intermittently preparatory to forming the slots representing spaces between the buts of the shingles in the manufacture of strip shingles.

From the intermittent slitter the felt passes on to the slotter and shingle cutter 91 which cuts the felt into shingle lengths and almost simultaneously therewith strikes out the portions between the slits for forming the slots at the butts of the succeeding shingle strips.

When the shingles or strips are severed from the felt they fall on to the carrier 92 which deposits them in one of the bundle compartments 93 of the bundling machine 94 after which the bundles 95 may be conducted to the automatic tying or baling machine where the shingles contained in each compartment 93 are secured in bundles by wire or the like encircling same.

In a composition roofing manufacturing machine where the entire operation is continuous, it is absolutely necessary that the various units of the mechanism be so adjusted that same will operate in timed relation. In the applicant's construction, suitable means are provided for simultaneously operating the different parts of the device and provision is also made for adjusting the various operating mechanisms.

In the form of construction selected to illustrate one form of the invention, the power shaft 50, or its equivalent, is provided for operating the machine. This power shaft may be considered as extending the full length of the machine as indicated by the single line in Figs. 2, 2a and 2b. It may be operated in any suitable manner as by a motor at one end, or since the shaft is so long it may be operated by a plurality of motors 60 arranged at suitable intervals along the shaft.

Each of the units A to L, inclusive, is operated independently through a cone friction pulley drive 70 together with the usual bevel gears 80. Each of the cone pulley drives is provided with a belt shifter 96 of any well-known construction whereby the velocity of the driven unit may be varied by infinitesimal amounts so that the whole machine may be so adjusted that all units and parts of the machine will operate in timed relation. This is considered an important feature of the invention because the operation of the different units varies with different conditions. For instance, the drying units D and E require different adjustments because the felt shrinks on being dried and, consequently, the rolls constituting unit E are required to operate at a slower speed than those of unit D in order not to tear or unduly stretch the felt. The thickness of the felt, the amount of granules applied, etc. necessitate adjustments in the speed of certain of the units. This adjustment is provided for by the cone pulley drives and the belt shifting mechanism provided with each unit.

In order to be practical, it has been found by experience that means should be provided for threading certain parts of the device that otherwise would be difficult and consume too much time, thereby necessitating shutting down the entire machine when the felt breaks or tears in two at these points. Most of the mechanism may be threaded with little difficulty without the necessity of making adjustments or employing special equipment for that purpose. In other units, as the saturator, the scraper and the smoothing roll units, special equipment or adjustments greatly facilitate this operation.

The special equipment for the saturator unit G is shown diagrammatically in Fig. 7. A pair of endless cord or wire bands 97 and 98 are provided for this purpose. These bands run in the same direction about the ends of the saturator rolls 37, 38, 39, 41 and 42. In practice, grooves are provided at one end of the rolls for receiving these bands. Since these bands are required only to thread the saturator they are provided at one end only of the rolls and the grooves for receiving them are located a few inches outwardly of the normal position of the adjacent edge of the felt so that when not required they do not contact the felt.

The bands are so arranged that the return runs or portions converge at the guide roll 35 whereby when it becomes necessary to thread the felt through the saturator one edge or corner of the felt is placed over the idler roll 35 and being caught by the converging bands is conducted through the saturator. It is then guided so as to cause it to move laterally away from the bands 97 and 98 to its normal operating position.

Suitable means are also provided for facilitating the threading of the felt between the upper scraper 44 and the lower scrapers 45 and 46. In the form of construction shown, this is accomplished by lowering one of the scrapers 45 or 46, or both. One arrangement for accomplishing this purpose is disclosed more or less diagrammatically in Fig. 6. The scrapers 45 and 46 are hinged at one end as at 99 and are connected at the opposite end to a bell-crank lever 101 pivoted as at 102.

The arm 103 of the bell-crank lever is connected to a rod 104 that is slidably mounted in suitable slots 105 in the blades. The parts are so constructed that the lever passes dead center when the scrapers are in elevated or operative position. A suitable stop 106 limits the downward movement of the handle 107 of the bell-crank 101. Instead of the bell-crank and slot arrangement, a bell-crank and link arrangement may be employed. In either case, however, the parts are arranged so that they will pass dead center for holding the scrapers in elevated position, thereby facilitating the adjustment thereof.

A similar arrangement is provided for threading the web through the scrapers 62, 63 and 64. In this construction, provision is made for lowering both ends of the lower scrapers 63 and 64, simultaneously. This mechanism is shown more or less diagrammatically in Figs. 3 and 4. In the form of construction shown which is by way of example only, the rear ends of the scrapers 63 and 64 are mounted on a shaft 108 which is supported by one or more links 109, pivoted as at 111. The opposite ends of the scrapers 63 and 64 are connected to an arm 112 of a bell-crank lever 113 which when in operative position passes dead center for holding the scrapers in elevated position in the manner above described. A suitable stop 120 is provided for limiting the movement of the bell-crank past dead center.

In coating the felt preparatory to applying the granules and talc, it is desirable that provision be made for adjusting one or more of the scrapers throughout their length, as otherwise the coating will be thicker in certain portions than in others. One form of adjustment is shown in Fig. 4, in which the scraper blade 114 is secured to its supporting bar 115 by a plurality of adjusting bolts 116, each of which is rigidly connected to the bar 115 and extends through an opening in a flange 117 on said blade. A set nut 118 above and a set nut 119 below the flange 117 on each bolt 116 in Fig. 5 enables the operator to adjust any portion of the scraper 114 in either direction throughout its length.

Where the ordinary immovable scraper is employed on the upper surface of the felt, it is not uncommon for foreign matter to become caught in front of the upper scraper 62, thus tearing or injuring the felt. In order to remedy this defect, mechanism which will now be described is employed.

The scraper 62 is made cylindrical and is caused to oscillate by a crank arm 121, link 122 and crank arm 123. The crank arm 123 is considerably longer than the crank arm 121 whereby when the shaft 124 is rotated from the shaft 125 the scraper 62 will oscillate thereby rolling over any foreign matter that may collect in front thereof with the minimum amount of damage to the felt.

The edge scrapers 65 are vertically arranged and scrape the surplus coating from the edge of the felt. They also function as guides for the felt. Each scraper is supported at its lower end by a link 126 and is connected to a bell-crank 127 at its upper end. The free arm of the bell-crank has a weight 128 attached to it which yieldingly holds the scraper in contact with the edge of the felt.

These scrapers not only scrape away the surplus bituminous material but also perform the function of centering or positioning the felt.

Suitable means are also provided for facilitating the threading of the unit J. As shown, the rolls 75 and 76 are adapted to be elevated above the upper rolls 72, 73 and 74, whereby the felt may be easily passed between the movable and stationary rolls. The movable rolls 75 and 76 may be elevated in any suitable manner. One form of elevating mechanism is shown diagrammatically in Fig. 8, in which the roll 75 is shown as being adapted to be elevated by a bell crank lever 129 arranged at each end of the roll. The arm 131 of the bell-crank 129 is connected to the bearing 132 for the roll journal by a link 133. By operating the handles 134 the roll may be elevated. It is held in either elevated or lowered position by the bell crank passing dead center, suitable stops 135 and 136 being provided to limit its movement past dead center in both directions.

The two rollers may both be connected to a common frame whereby they may both be elevated and lowered together. The bell crank levers are shown only diagrammatically and are in practice arranged to operate in a plane at right angles to the plane of the rolls.

What I claim, therefore, is:

1. A continuously operating machine comprising in combination, mechanism for forming felt, drying mechanism, mechanism including a receptacle for containing waterproofing material and feed rolls for pulling said felt through said material for impregnating said felt with said waterproofing material while the same is still warm from the drying mechanism, mechanism for coating said felt with an asphaltic compound, means for applying granules to said coating, means including cooling rolls about which said felt is led for cooling the granule-coated felt, means for operating said mechanism in timed relation, and means for independently adjusting the operation of each of said mechanisms.

2. A continuously operating machine comprising in combination, felt forming mechanism including drying rolls, mechanism for saturating said felt with waterproofing material while it is still warm from said drying rolls, means for coating said felt with a binder, means for applying granules to the coated felt, mechanism for slitting, slotting and cutting said felt into shingles, and means for operating said means and mechanisms in adjustable timed relation.

3. A continuously operating machine comprising in combination, mechanism for forming felt, drying mechanism, mechanism including a receptacle for containing waterproofing material and feed rolls for pulling said felt through said material for impregnating said felt with said waterproofing material while the same is still warm from the drying mechanism, means for threading said impregnating mechanism whereby the operation of said felt forming device and impregnating mechanism is not interrupted, mechanism for coating said felt with an asphaltic compound, means for applying granules to said coating, means including cooling rolls about which said felt is led for cooling the granule-coated felt, means for operating said mechanism in timed relation, and means for independently adjusting the operation of each of said mechanisms.

ARTHUR G. LEONARD, Jr.